(12) United States Patent
Statchuk

(10) Patent No.: US 9,075,887 B2
(45) Date of Patent: Jul. 7, 2015

(54) METHOD AND SYSTEM FOR CREATING PERVASIVE DATA FORM REPORTING

(75) Inventor: Craig A. Statchuk, Ontario (CA)

(73) Assignee: International Business Machines Corporation, Armonk, NY (US)

( * ) Notice: Subject to any disclaimer, the term of this patent is extended or adjusted under 35 U.S.C. 154(b) by 769 days.

(21) Appl. No.: 12/627,980

(22) Filed: Nov. 30, 2009

(65) Prior Publication Data

US 2011/0131270 A1    Jun. 2, 2011

(51) Int. Cl.
  G06F 15/16    (2006.01)
  G06F 17/30    (2006.01)
  H04L 29/08    (2006.01)

(52) U.S. Cl.
  CPC ............ G06F 17/3089 (2013.01); H04L 67/02 (2013.01); H04L 67/2838 (2013.01); G06F 17/30867 (2013.01)

(58) Field of Classification Search
  CPC ..... H04L 67/02; H04L 67/26; H04L 67/2838; G06Q 30/02; G06F 17/308; G06F 17/30867; G06F 17/308679
  USPC .......................................... 709/203, 219, 217
  See application file for complete search history.

(56) References Cited

U.S. PATENT DOCUMENTS

| | | | |
|---|---|---|---|
| 2007/0061393 A1 | 3/2007 | Moore | |
| 2007/0120857 A1* | 5/2007 | Patel et al. | 345/440 |
| 2007/0156809 A1 | 7/2007 | Dickinson et al. | |
| 2009/0019107 A1* | 1/2009 | Lance et al. | 709/203 |
| 2009/0282385 A1* | 11/2009 | Boland et al. | 717/106 |
| 2009/0287758 A1* | 11/2009 | Hamilton et al. | 709/201 |

* cited by examiner

Primary Examiner — Viet Vu
Assistant Examiner — Herman Belcher
(74) Attorney, Agent, or Firm — Patterson & Sheridan, LLP

(57) ABSTRACT

A content syndication system is disclosed where a syndicated data feed entry may include whatever information contributed to the content of that feed entry. Doing so allows business reporting and analytics tools to consume both the feed information (e.g., a summary of a report) and the underlying data (e.g., a collection of database records). A feed-reader application that does not understand the extended feed data (i.e., the information which contributed to the content of the feed entry) simply disregards the extended content. Thus, the extended feeds may be included in email messages, documents and other packaging and delivery mechanisms since no additional information is needed to consume or render formatted content.

15 Claims, 6 Drawing Sheets

METHOD AND SYSTEM FOR CREATING PERVASIVE DATA FORM REPORTING

BACKGROUND OF THE INVENTION

1. Field of the Invention

Embodiments of the invention generally relate to syndicated data feeds in a networked computing environment. More specifically, embodiments of the invention relate to techniques for including data values and metadata used to generate a feed entry as part of a data syndication feed.

2. Description of the Related Art

During the past few years, web content syndication technology has grown in importance both on the Internet and in private networks. As a result, two popular standards have emerged for syndicating web content, RSS and Atom. Atom is defined by two related standards—the Atom publishing protocol and the Atom syndication format. The two Atom standards provide a feed format for representing (and a protocol for editing) web resources such as weblogs, online journals, wikis, and similar content.

A web feed generally provides a document (e.g., an XML document) with content items which include links to the source of the content. The Atom syndication format defines the syntax of a language for web feeds. In particular, the Atom Publishing Protocol is an HTTP-based approach for creating and editing Web resources. It is designed around the basic operations provided by the HTTP protocol (such as GET, PUT, and DELETE) to pass around instances of an Atom feed and entry documents that represent things like blog entries, podcasts, wiki pages, calendar entries and so on. Since being made available, Atom has been deployed to millions of web sites and is supported by every major syndication platform on the market. RSS, short for really simple syndication, provides many similar capabilities for syndicating web-based content.

SUMMARY OF THE INVENTION

One embodiment of the present invention includes a computer-implemented method for generating a feed entry for a syndicated data feed. The method may generally include receiving feed data to include in an entry in the syndicated data feed. The feed data itself may have been generated from a collection of source data. The method may also include receiving extended feed data to include in the syndicated data feed. The extended feed data may include the collection of source data used to generate the feed data. The method may also include generating, from the feed data and the extended feed data, the entry to include in the syndicated data feed and publishing the entry for the syndicated data feed to a feed server executing in a networked computing environment.

Another embodiment of the invention includes a computer-readable storage medium containing a program which, when executed by a processor, performs an operation for generating a feed entry for a syndicated data feed. The operation may generally include receiving feed data to include in an entry in the syndicated data feed. The feed data itself may have been generated from a collection of source data. The operation may also include receiving extended feed data to include in the syndicated data feed. The extended feed data may include the collection of source data used to generate the feed data. The operation may also include generating, from the feed data and the extended feed data, the entry to include in the syndicated data feed and publishing the entry for the syndicated data feed to a feed server executing in a networked computing environment.

Still another embodiment of the invention includes a system having one or more computer processors and a memory containing a program, which when executed by the one or more computer processors is configured to perform an operation for generating a feed entry for a syndicated data feed. The operation itself may generally include receiving feed data to include in an entry in the syndicated data feed. The feed data itself may have been generated from a collection of source data. The operation may also include receiving extended feed data to include in the syndicated data feed. The extended feed data may include the collection of source data used to generate the feed data. The operation may also include generating, from the feed data and the extended feed data, the entry to include in the syndicated data feed and publishing the entry for the syndicated data feed to a feed server executing in a networked computing environment.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
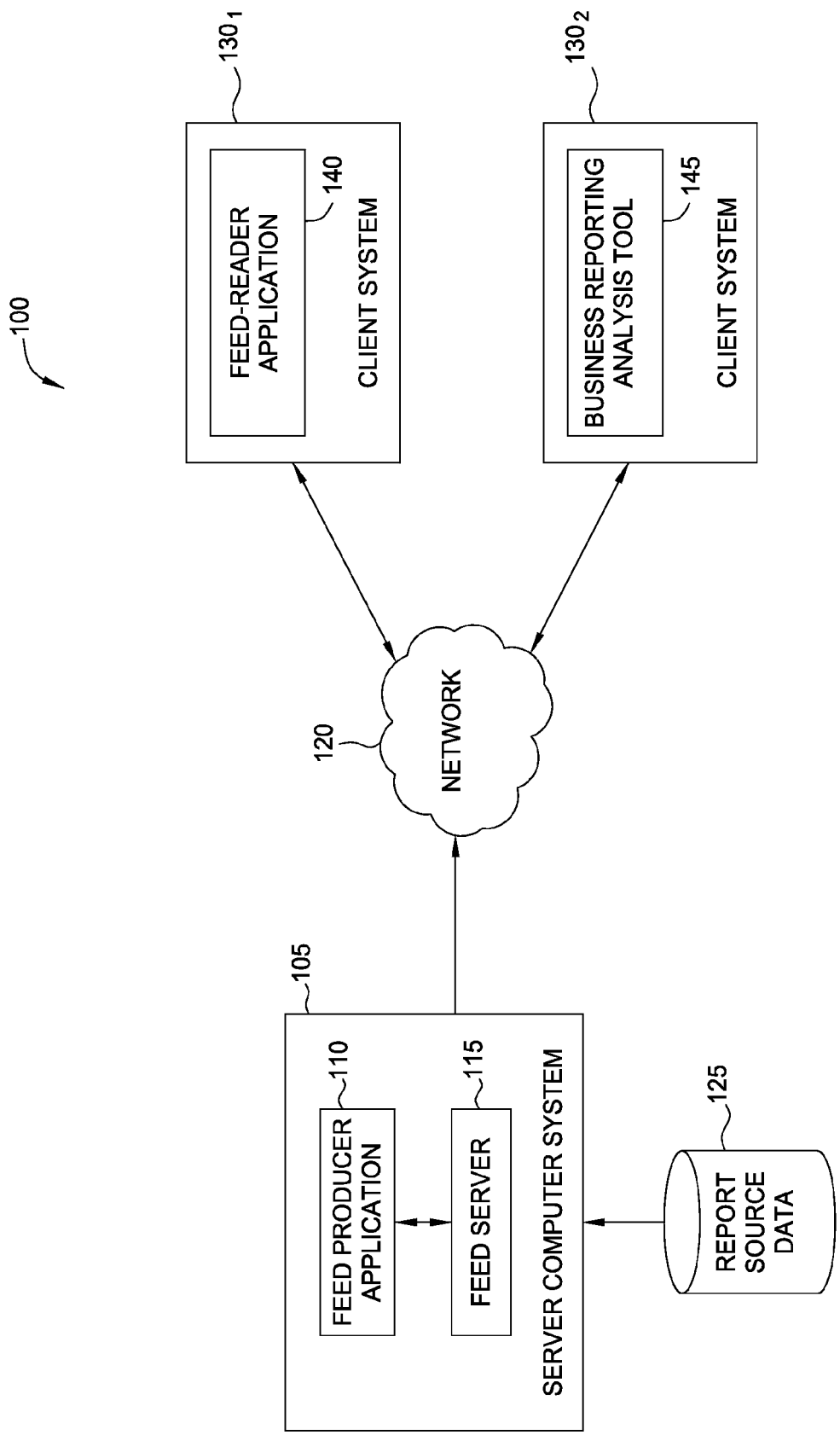
FIG. 1 illustrates a computing infrastructure configured for including data values and metadata used to generate feed entries in a content syndication feed, according to one embodiment of the invention.

Embodiments of the invention are generally directed to a method and system which provide a universal reporting system using, e.g., an Atom feed or other content syndication format. In particular, embodiments of the invention provide a content syndication system where a syndicated feed entry may include whatever information contributed to the content of that feed entry. Doing so allows business reporting and analytics tools to consume both the feed information (e.g., a summary of a report) and the underlying data (e.g., a collection of database records). A feed-reader application that does not understand the extended feed data (i.e., the information which contributed to the content of the feed entry) simply disregards the extended content, while still providing the regular feed content (e.g., the summary in a syndicated Atom feed). Thus, the extended feeds may be included in email messages, documents and other packaging and delivery mechanisms since no additional information is needed to consume or render formatted content.

On the other hand, an extended feed reader may consume the extended feed data and process this information as is appropriate for the needs of a particular case. For example, in a case where the extended data provides a collection of database records, the extended feed reader may store the records in a database on the client, pass the records to an analytics application, populate an OLAP cube, or generate a business report configured according to a report specification (i.e., a description of report content, layout, and a feed producer).

In one embodiment, a feed production application generates (or updates) an Atom feed that includes report metadata, layout data and values to provide sufficient information to reproduce a report referenced by a feed entry in its entirety. For example, where the feed provides a summary of data, the feed entry generated by the application includes that data along with the summary. An extended Atom feed combined with the extended feed reader software may replace the report tool software conventionally needed for report production. Advantageously, therefore, applications created for a variety of display environments, such as mash-ups, portals or dashboards, can render the original report without assistance from the reporting tool itself.

In one embodiment, entries in an extended Atom feed include the metadata needed to independently render a report with all data values. Alternatively, however, the feed entry may include metadata needed to independently render a report with references to the data sources needed to provide report values. Examples of the report values can be traditional data sources like spreadsheets and databases, other Atom feeds or other Extended Atom Feeds.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Further, a particular embodiment of the invention is described using a feed production application, feed server, and extended feed reader configured using the Atom standard as particular example of a universal reporting system. However, it should be understood that the invention may be adapted to for a broad variety of syndication formats such as RSS and other syndication technologies (whether currently known or subsequently developed). Accordingly, references to the Atom syndication format are merely illustrative and not limiting.

FIG. 1 illustrates a computing infrastructure 100 configured for including data values and metadata used to generate feed entries within a content syndication feed, according to one embodiment of the invention. As shown, the computing infrastructure 100 includes a server computer system 105 and a plurality of client systems $130_{1-2}$, each connected to a communications network 120.

The client systems $130_{1-2}$ communicate with the server system 105 over the network 120 to retrieve a syndicated data feed published by a feed server 115 on the server computer system 105. As noted above, the two main formats currently in use for web feeds are RSS and Atom and embodiments of the invention may be adapted to extend either of these (or other) syndication formats. Each client system $130_{1-2}$ may include a feed reader application configured to retrieve a feed served by the feed server 115. For example, client system $130_1$ includes a feed reader application 140. The feed reader application 140 may be a plug-in component for a web browser configured to render feed data downloaded from the feed server 115. Alternatively, the feed reader application 140 may be configured as a stand-alone feed reader. In one embodiment, the feed provided by the feed server 115 is a document (e.g., an XML document) that includes one or more feed entries generated by the feed production application 110. In such a case, feed reader application 140 may connect to the feed server 115 and determine whether the feed has been updated, based on metadata included in the feed. If new entries are present in the feed, the feed reader application 140 may retrieve and render such entries for display on the client $130_1$.

Similarly, client system $130_2$ includes a business reporting/analysis tool 145. In one embodiment, the business reporting/analysis tool 145 provides a software application configured to parse extended feed data from a feed entry and evaluate it as appropriate in particular case. As shown, the server system 105 includes the feed server 115. Server system 105 also includes a feed production application 110 and source data 125. In one embodiment, the feed production application 110 may be configured to generate the feed entries published to a given feed from the source data 125. Accordingly, source data 125 is included to be representative of a broad variety of data sources, e.g., relational databases, OLAP cubes, web services, spread sheets, structured and unstructured documents, etc. In an embodiment using Atom as the syndication format, each feed entry may be included within an <entry> . . . </entry> markup element within the XML document representing a particular feed and the extended feed data may be marked up using whatever mark-up tags are created for use in a particular case to describe the extended feed data (referred to in the Atom standard as foreign markup).

Figure 2:
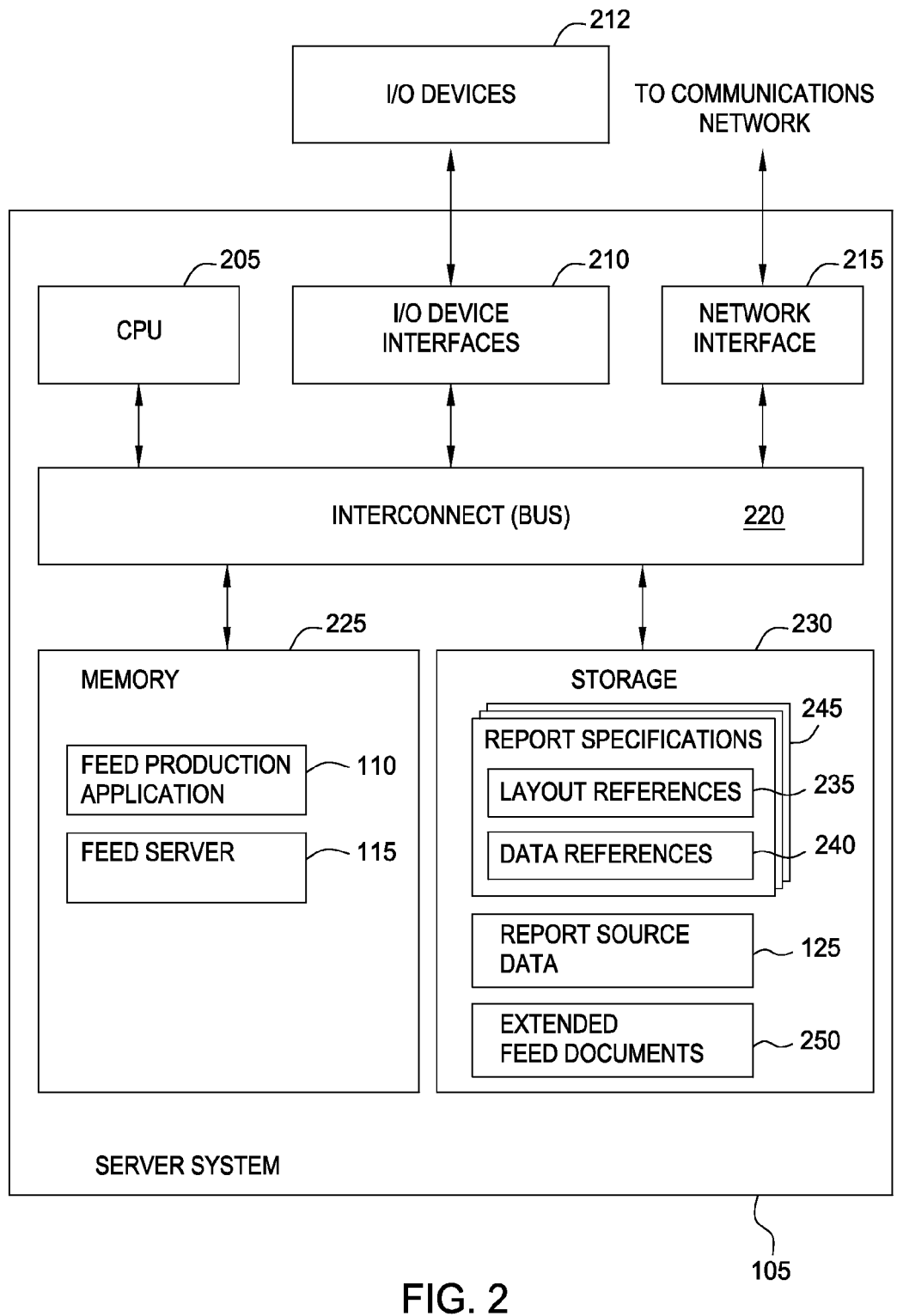
FIG. 2 is a more detailed view of the server computing system of FIG. 1, according to one embodiment of the invention.

FIG. 2 is a more detailed view of the computing system 105 of FIG. 1, according to one embodiment of the invention. As shown, the server computing system 105 includes, without limitation, a central processing unit (CPU) 205, a network interface 215, an interconnect 220, a memory 225, and storage 230. The computing system 105 may also include an I/O devices interface 210 connecting I/O devices 212 (e.g., keyboard, display and mouse devices) to the computing system 105.

The CPU 205 retrieves and executes programming instructions stored in the memory 225. Similarly, the CPU 205 stores and retrieves application data residing in the memory 225. The interconnect 220 facilitates transmission of programming instructions and application data between the CPU 205, I/O devices interface 210, storage 230, network interface 215, and memory 225. CPU 205 is included to be representative of a single CPU, multiple CPUs, a single CPU having multiple processing cores, and the like. And the memory 225 is generally included to be representative of a random access memory. The storage 230 may be a disk drive storage device. Although shown as a single unit, the storage 230 may be a combination of fixed and/or removable storage devices, such as fixed disc drives, floppy disc drives, tape drives, removable memory cards, optical storage, network attached storage (NAS), or a storage area-network (SAN).

Illustratively, the memory 225 includes the feed production application 110 and feed server application 115, and storage 230 includes one or more report specifications 245, the report source data 125, and extended feed document 250.

In one embodiment, the feed production application 110 may be configured to generate a feed from a report, itself generated from one of the report specifications 245. As shown, each report specification 245 includes a set of layout references 235 and a set of data references 240. That is, each report specification 245 specifies what data should go into a given report, and how that data should be arranged. For example, data references 235 may provide a number of database queries used to retrieve data from report source data 125 (e.g. a relational database) which are arranged according to the layout references 245. The feed production application 110 may be configured to generate (or receive) such a report (e.g., a weekly sales report) and from the information, generate an entry to include in extended feed document 250.

As noted above, the feed server 115 may provide an Atom syndication server configured to publish an Atom feed (i.e., an XML document configured according to the Atom syndication format), represented in FIG. 2 by the extended feed document 250. In one embodiment, each entry in the feed document 250 (published by the feed server 115) may include any information from report source data 125 which contributed to actual content of that particular feed entry. For example, assume a set of feeds published within a distributed business operation where one of the feeds provides entries which each provide a summary of sales data for a particular group, unit, or region within the distributed business operation (on a periodic basis). In such a case, in addition to feed entries summarizing a report generated from one of the report specifications 245 (e.g., a weekly sales report), the feed entries may include extended feed data. For example, the extended feed data could correspond to the underlying sales data upon which a given summary entry is based—i.e., to the data retrieved using the data references 240 of the particular report speciation 245 (e.g., of the weekly sales report). That is, in one embodiment, each entry in the extended feed document 250 may include both the entry itself (e.g., an <entry> . . . </entry> element of an Atom feed) as well as include the underlying report metadata, layout data, and data values which contributed to the content of that entry—marked up using a collection of markup tags adapted for the needs of any particular case.

Figure 3:
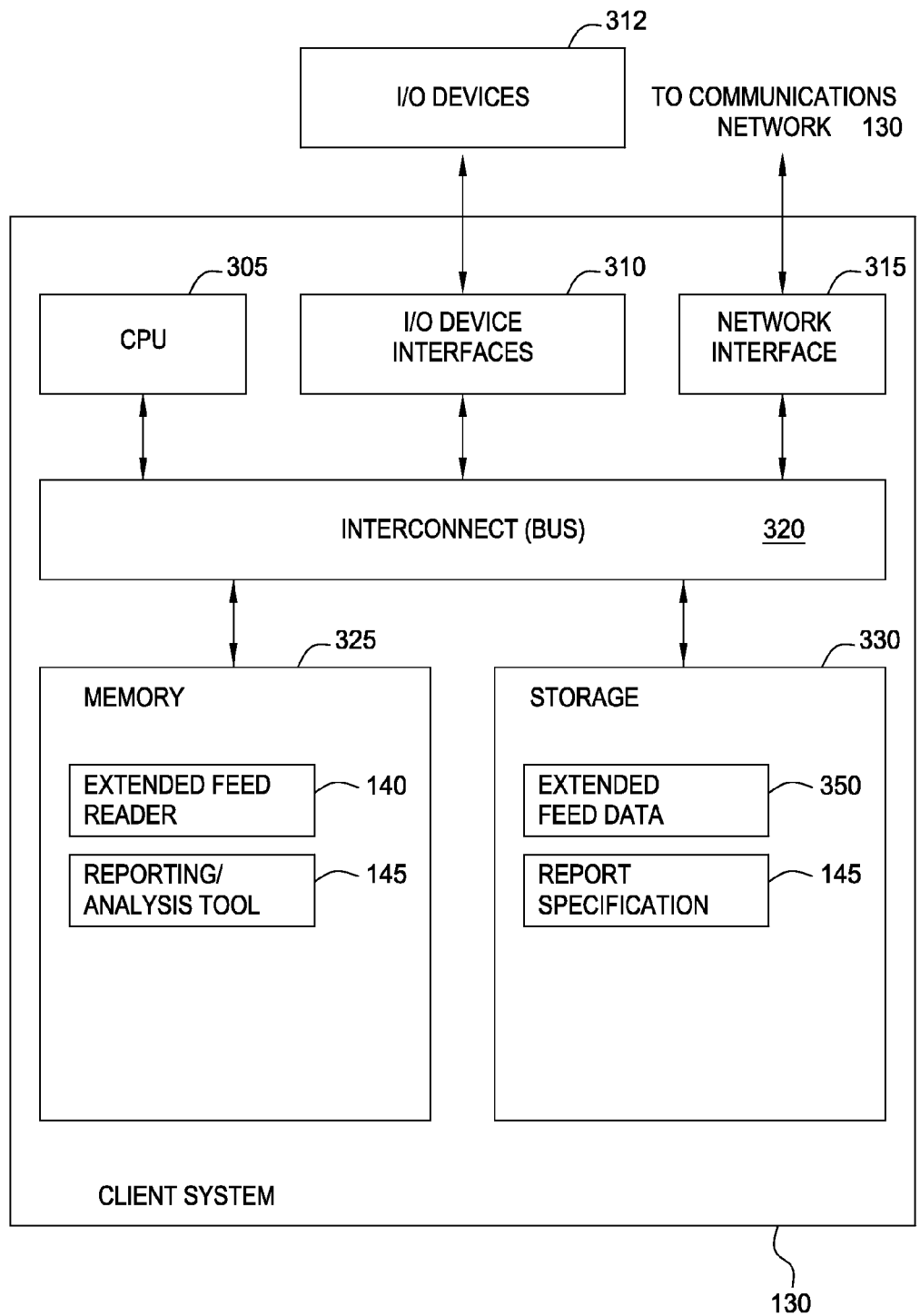
FIG. 3 is a more detailed view of the client system of FIG. 1, according to one embodiment of the invention.

FIG. 3 is a more detailed view of the client system 130 of FIG. 1, according to one embodiment of the invention. As shown, client system 130 includes, without limitation, a central processing unit (CPU) 305, a network interface 315, an interconnect 320, a memory 325, and a storage 330. The client system 130 may also include an I/O devices interface 310 connecting I/O devices 312 (e.g., keyboard, display and mouse devices) to the client system 130.

Like, CPU 205 of FIG. 3, CPU 305 is configured to retrieve and execute programming instructions stored in the memory 325 and storage 330. Similarly, the CPU 305 is configured to store and retrieve application data residing in the memory 325 and storage 330. The interconnect 320 is configured to facilitate data transmission, such as programming instructions and application data, between the CPU 305, I/O devices interface 310, storage unit 330, network interface 305, and memory 325. Like CPU 205, CPU 305 is included to be representative of a single CPU, multiple CPUs, a single CPU having multiple processing cores, and the like. Memory 325 is generally included to be representative of a random access memory. Storage 330, such as a hard disk drive or flash memory storage drive, may store non-volatile data. The network interface 315 is configured to transmit data via the communications network 120.

As shown, the memory 325 stores programming instructions and data, including an extended feed reader 140, and a reporting/analysis tool 145, and storage 330 includes extended feed data 350 and a report specification 355. In one embodiment, the extended feed reader 140 and/or the reporting/analysis tool 145 may be configured access a feed document published by the feed server 115. As noted, such a feed may provide an XML document with markup tags corresponding to the Atom syndication format, i.e., a document with a <feed> element containing one or more <entry> . . . </entry> elements. Further, each entry may include additional data with an arbitrary set of markup, i.e., extended feed data 350. In one embodiment, the extended feed data 350 may provide whatever information was used to generate the syndicated feed entry (i.e., the <entry> . . . </entry> elements in the case of an Atom feed). For example, the extended feed data may provide relational database records, OLAP cube data, spread sheets data, structured and unstructured documents, etc.

The extended feed reader 140 may parse an Atom feed, and store the extended feed data 350 in storage 330. However, if the same Atom feed is accessed by a conventional feed reader, the extended feed data 350 may simply be ignored. In such a case, the feed reader would render a display of the feed (i.e., the <entry> . . . </entry> elements in the case of an Atom feed) and disregard the extended feed data 350.

In one embodiment, the reporting/analysis tool 145 may evaluate the extended feed data 350 as appropriate for a particular case. Continuing with the example of a feed publishing a summary of a report of weekly sales data, the extended feed data 350 may include all of the data necessary to recreate the original business report (according to report specification 355). In such a case, reporting/analysis tool 145 could be configured to identify trends occurring in sales volumes using the extended feed data 350 or drill down into the summary report of weekly sales data. Of course, the reporting/analysis tool 145 may perform a broad variety of data analytics or reporting functions using the extended feed data 350, depending on the needs of a particular case. That is, the extended feed data 350 may be used in a variety of display environments, such as mash-ups, portals or dashboards, etc.

Figure 4:
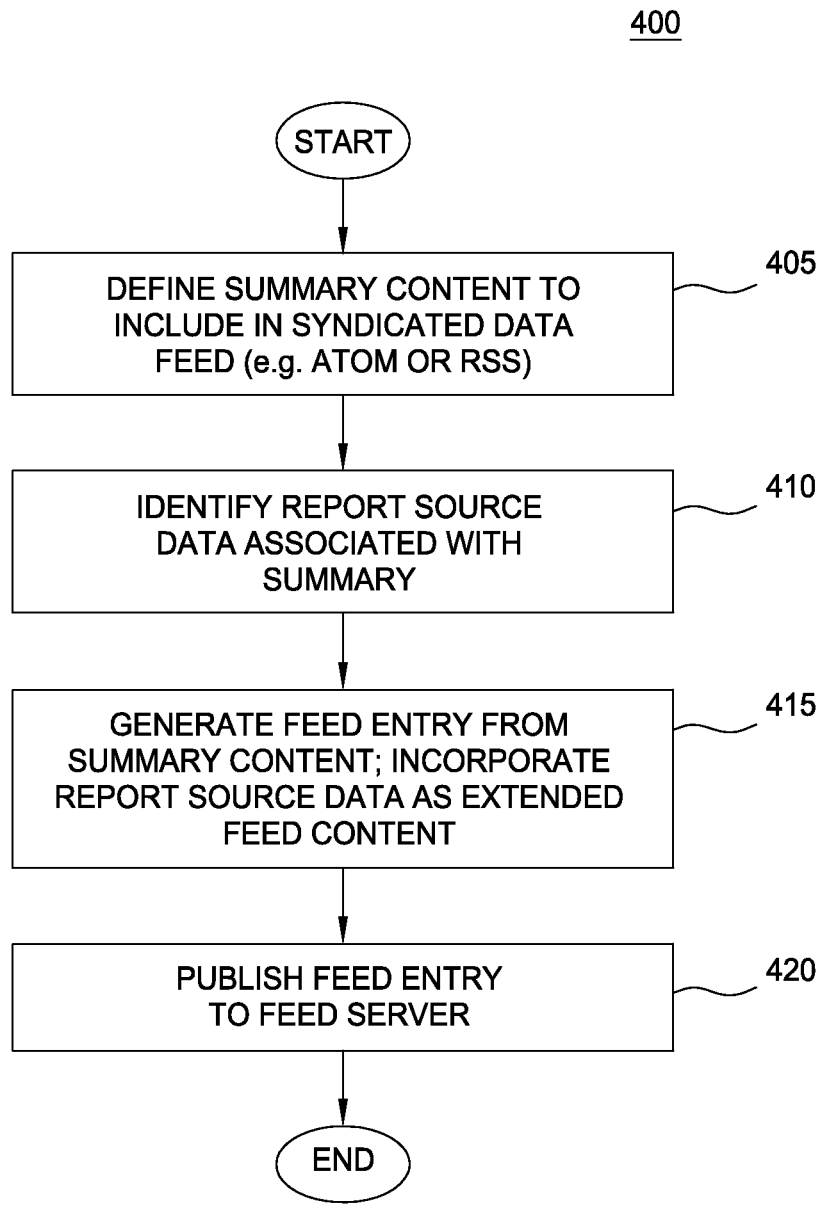
FIG. 4 illustrates a method for generating and publishing an entry for a content syndication feed, where the entry includes data values and metadata used to generate the entry, according to one embodiment of the invention.

FIG. 4 illustrates a method 400 for generating and publishing an entry for a content syndication feed, where the entry includes extended feed data, according to one embodiment of the invention. As shown, the method 400 begins at step 405 where a feed producer generates summary content to include in a syndicated data feed, such as an Atom or RSS feed. In one embodiment, the summary content generated for a feed may be based on a report, the report itself generated from a collection of data sources. For example, as noted above, a report may be defined relative to a report specification which includes data references and layout references specifying what data should be included in a report, as well as an arrangement of that data. At step 410, the feed producer identifies report source data associated with the summary. For example, the collection of database records retrieved using queries included in a report specification.

At step 415, the feed producer may generate a feed entry from the summary content. For example, the feed producer may generate an <entry> . . . </entry> element for an Atom feed. Additionally, the feed producer may incorporate the report source data identified at step 410 in the feed entry. In the case of an Atom feed, the feed producer may markup the source data using a set of markup up tags tailored for use in a particular case (referred to in the Atom standard as foreign markup).

At step 420, the feed producer publishes the feed entry generated over steps 405-415. Continuing with the use of the Atom as an example, the feed producer may add the <entry> . . . </entry> element to the <feed> . . . </feed> element of the appropriate feed document. In such a case, the feed producer would also update the <updated> . . . </updated> element of the atom feed as well. Of course, as noted above, syndication formats other than Atom may be used. Once published, the feed may be accessed by any number of clients, whether capable of processing the extended feed data or not.

Figure 5:
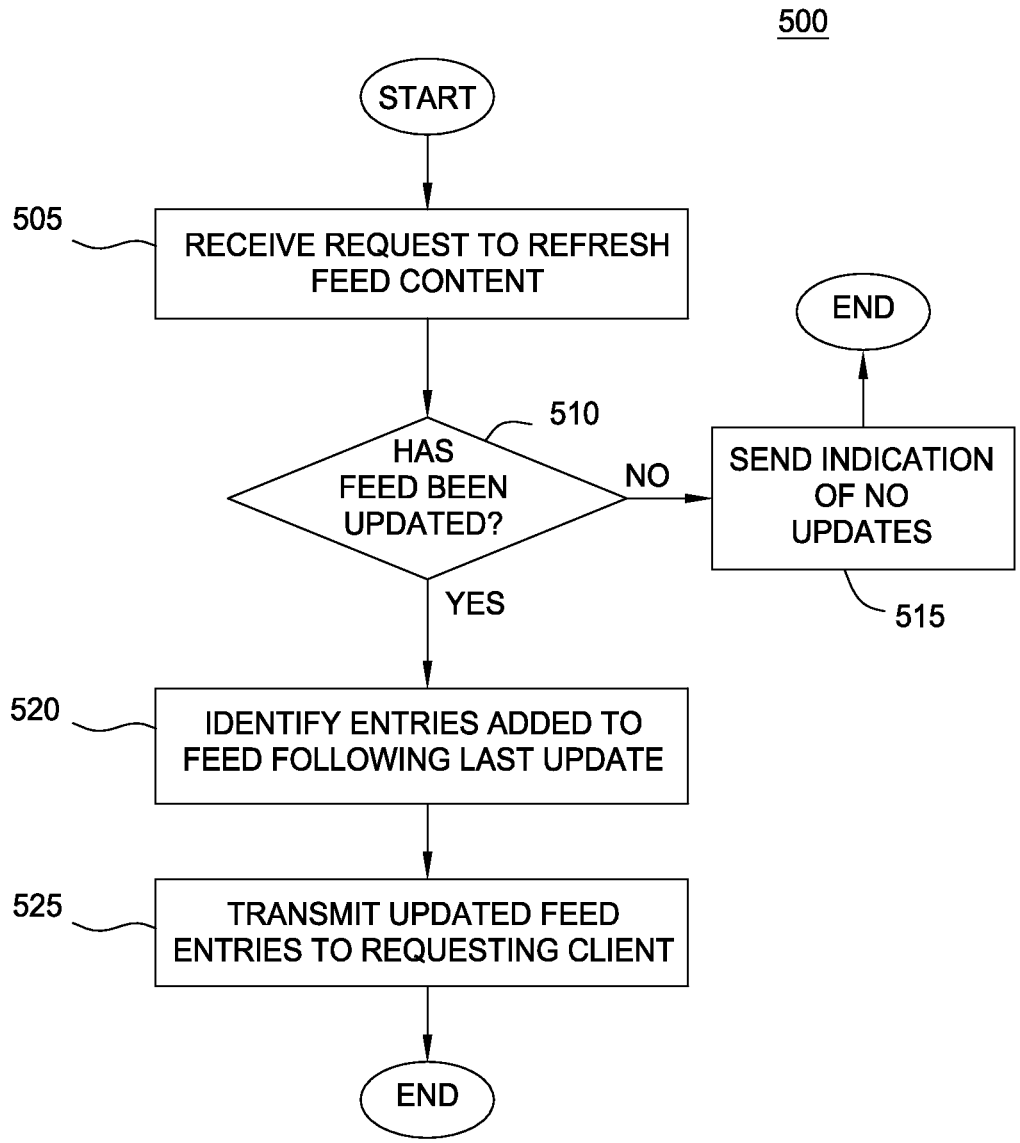
FIG. 5 illustrates a method for retrieving entries from a syndicated feed server which includes data values and metadata used to generate the entries, according to one embodiment of the invention.

FIG. 5 illustrates a method 500 for retrieving entries from a syndicated feed server which includes data values and metadata used to generate the entries, according to one embodiment of the invention. As shown, the method 500 begins at step 505 where a feed server receives a request from a client to request a given syndicated feed (e.g., an Atom feed). At step 510, the feed server may determine whether the feed has been updated following the latest time the requesting client refreshed the feed. If the feed has not been updated, then at step 515, the feed server returns a message to the request indicating that the feed has not changed since the last time the client was updated. Otherwise, at step 520, the feed server identifies entries added to the feed since the last time the client was updated. As noted above, such entries may include feed content (e.g., a <summary> . . . </summary> element in an <entry> . . . </entry> of an Atom feed), but may also include extended feed data. In one embodiment, the extended feed includes whatever information contributed to the content of the feed entries identified at step 520. For example, the database (or other data) records used to generate the content of the <summary> . . . </summary> element of an Atom feed. At step 525, the feed entries identified as step 520, and any extended feed data associated with such entries, may be transmitted to the requesting client.

Figure 6:
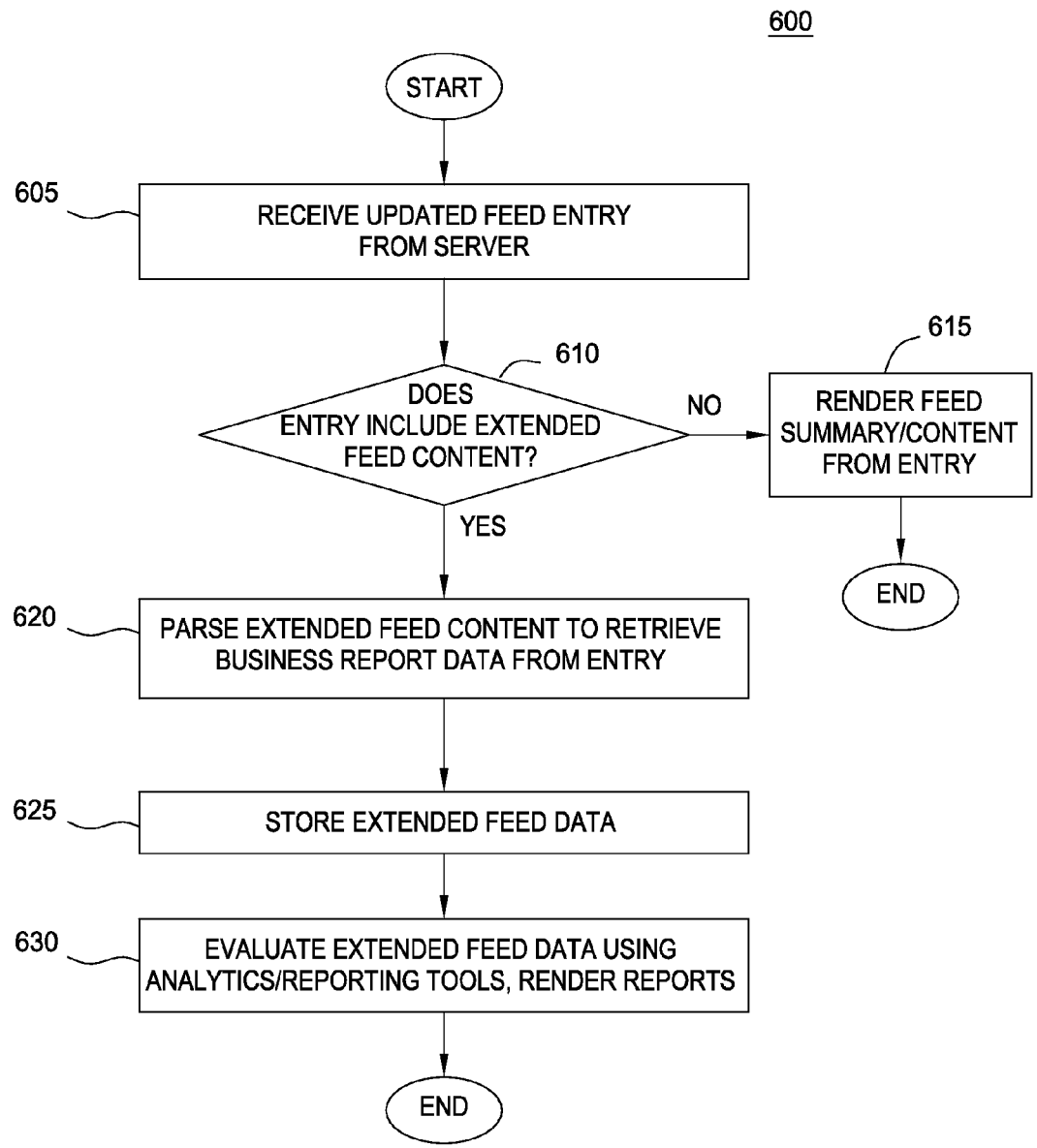
FIG. 6 illustrates a method for processing extended feed data included in an entry retrieved from a syndicated feed server, according to one embodiment of the invention.

FIG. 6 illustrates a method 600 for processing extended feed data included in an entry retrieved from a syndicated feed server, according to one embodiment of the invention. As shown, the method 600 begins at step 605 where a feed reader (or business reporting/analysis tool) receives updated feed entries from a syndicated data feed. At step 610, the feed reader determines whether any of the feed entries include extended feed data. If not, then at step 615, the feed reader may render the content of the entry (e.g., the data in the <summary> . . . </summary> or <content> . . . </content> elements of an Atom feed entry). Otherwise, at step 620, the feed reader parses the syndicated feed entries to identify the extended feed data. Using the example from above where the feed entry provides a summary of weekly sales data, the extended feed data would include the actual sales data used to generate the summary. At step 625, the extended feed data may be stored by the client system. For example, if the extended feed data includes a set of database records, then such records may be stored in a database system at the client. And at step 630, the extended feed data may be evaluated by applications on the client system, e.g., to build and render a variety of displays such as mash-ups, portals or dashboards—or the original report on which the summary content provided by the syndicated data feed is based.

Advantageously, embodiments of the invention provide a universal reporting system using, e.g., an Atom feed or other content syndication format. In particular, a syndicated feed entry may include whatever information contributed to the content of that feed entry. Doing so allows business reporting and analytics tools to consume both the feed information (e.g., a summary of a report) and the underlying data (e.g., a collection of database records). A feed-reader application that does not understand the extended feed data (i.e., the information which contributed to the content of the feed entry) simply disregards the extended content, while still providing the regular feed content (e.g., the <summary> . . . </summary> content from entries in a syndicated Atom feed).

While the foregoing is directed to embodiments of the present invention, other and further embodiments of the invention may be devised without departing from the basic scope thereof, and the scope thereof is determined by the claims that follow.

What is claimed is:

1. A computer-implemented method for generating a feed entry for a syndicated data feed, the method comprising:
    receiving feed data to include in an entry in the syndicated data feed, wherein the feed data is generated from a collection of source data;
    receiving extended feed data to include in the entry of the syndicated data feed, wherein the extended feed data includes the collection of source data used to generate the feed data;
    generating, by operation of one or more computer processors, from the feed data and the extended feed data, the entry to include in the syndicated data feed;
    publishing the entry for the syndicated data feed to a feed server executing in a networked computing environment;
    receiving, from a requesting client computing device, a request for the syndicated data feed; and
    transmitting at least the entry to the requesting client in response to the request, wherein the client computing device is configured to perform an operation, comprising:
        parsing the entry to identify the extended feed data, and storing, on the client computing device, the extended feed data.

2. The method of claim 1, wherein the collection of source data includes a report specification which includes report metadata, report layout data, and report data values used to generate a report corresponding to the report specification.

3. The method of claim 2, wherein the feed data is generated from the report specification.

4. The method of claim 1, wherein the syndicated data feed is an Atom feed.

5. The method of claim 1, wherein the syndicated data feed is an RSS feed.

6. A non-transitory computer-readable storage medium containing a program which, when executed by a processor, performs an operation for generating a feed entry for a syndicated data feed, the operation comprising:
    receiving feed data to include in an entry in the syndicated data feed, wherein the feed data is generated from a collection of source data;
    receiving extended feed data to include in the entry in the syndicated data feed, wherein the extended feed data includes the collection of source data used to generate the feed data;
    generating, by execution of the program on the processor, from the feed data and the extended feed data, the entry to include in the syndicated data feed;
    publishing the entry for the syndicated data feed to a feed server executing in a networked computing environment;
    receiving, from a requesting client computing device, a request for the syndicated data feed; and
    transmitting at least the entry to the requesting client in response to the request, wherein the client computing device is configured to perform an operation, comprising:
        parsing the entry to identify the extended feed data, and storing, on the client computing device, the extended feed data.

7. The non-transitory computer-readable storage medium of claim 6, wherein the collection of source data includes a report specification which includes report metadata, report layout data, and report data values used to generate a report corresponding to the report specification.

8. The non-transitory computer-readable storage medium of claim 7, wherein the feed data is generated from the report specification.

9. The non-transitory computer-readable storage medium of claim 6, wherein the syndicated data feed is an Atom feed.

10. The non-transitory computer-readable storage medium of claim 6, wherein the syndicated data feed is an RSS feed.

11. A system, comprising:
    one or more computer processors; and
    a memory containing a program, which when executed by the one or more computer processors is configured to perform an operation for generating a feed entry for a syndicated data feed, the operation comprising:
        receiving feed data to include in an entry in the syndicated data feed, wherein the feed data is generated from a collection of source data,
        receiving extended feed data to include in the entry in the syndicated data feed, wherein the extended feed data includes the collection of source data used to generate the feed data,
        generating, from the feed data and the extended feed data, the entry to include in the syndicated data feed,
        publishing the entry for the syndicated data feed to a feed server executing in a networked computing environment, receiving, from a requesting client computing device, a request for the syndicated data feed; and transmitting at least the entry to the requesting client in response to the request, wherein the client computing computing device is configured to perform an operation, comprising:

parsing the entry to identify the extended feed data; and storing, on the client computing device, the extended feed data.

12. The system of claim 11, wherein the collection of source data includes a report specification which includes report metadata, report layout data, and report data values used to generate a report corresponding to the report specification.

13. The system of claim 12, wherein the feed data is generated from the report generated from the report specification.

14. The system of claim 11, wherein the syndicated data feed is an Atom feed.

15. The system of claim 11, wherein the syndicated data feed is an RSS feed.

\* \* \* \* \*